(12) United States Patent
Wang et al.

(10) Patent No.: US 9,669,354 B2
(45) Date of Patent: Jun. 6, 2017

(54) METHOD AND APPARATUS FOR COLLECTING CARBON DIOXIDE FROM FLUE GAS

(71) Applicant: WUHAN KAIDI GENERAL RESEARCH INSTITUTE OF ENGINEERING & TECHNOLOGY CO., LTD., Wuhan (CN)

(72) Inventors: Zhilong Wang, Wuhan (CN); Yanfeng Zhang, Wuhan (CN)

(73) Assignee: WUHAN KAIDI GENERAL RESEARCH INSTITUTE OF ENGINEERING & TECHNOLOGY CO., LTD., Wuhan (CN)

( * ) Notice: Subject to any disclaimer, the term of this patent is extended or adjusted under 35 U.S.C. 154(b) by 116 days.

(21) Appl. No.: 14/311,379

(22) Filed: Jun. 23, 2014

(65) Prior Publication Data

US 2014/0301929 A1    Oct. 9, 2014

Related U.S. Application Data

(63) Continuation-in-part of application No. PCT/CN2012/083575, filed on Oct. 26, 2012.

(30) Foreign Application Priority Data

Dec. 23, 2011    (CN) .......................... 2011 1 0437154

(51) Int. Cl.
*B01D 53/62*    (2006.01)
*B01D 53/96*    (2006.01)
(Continued)

(52) U.S. Cl.
CPC ......... *B01D 53/62* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS

2009/0291874 A1* 11/2009 Bara ..................... C11D 7/3209
510/175
2010/0011958 A1*  1/2010 Cadours ............. B01D 53/1425
95/187

FOREIGN PATENT DOCUMENTS

CN    101177267 A  *  5/2008  ............. C01B 31/20

* cited by examiner

*Primary Examiner* — Daniel Berns
(74) *Attorney, Agent, or Firm* — Matthias Scholl P.C.; Matthias Scholl

(57)  ABSTRACT

A method for collecting carbon dioxide from flue gas of a power plant. The method includes: 1) mixing an organic amine, an ionic liquid, and water to obtain an aqueous solution of a composite absorbent; 2) spraying the aqueous solution of the composite absorbent into the flue gas to allow the flue gas flowing upwardly to fully contact with the downwardly sprayed aqueous solution of the composite absorbent and to allow $CO_2$ in the flue gas to react with the composite absorbent to yield a solution rich in $A.CO_2$ and $B.CO_2$, where A represents the organic amine and B represents the ionic liquid; allowing the solution rich in $A.CO_2$ and $B.CO_2$ to stand and clarify to form different liquid layers; 3) thermally decomposing the mixed solution rich in $A.CO_2$ and $B.CO_2$ after heat exchange to release the chemically bound $CO_2$.

13 Claims, 1 Drawing Sheet

(51) Int. Cl.
  *B01D 53/77*  (2006.01)
  *B01D 53/78*  (2006.01)
  *B01D 53/79*  (2006.01)
  *B01D 53/14*  (2006.01)

(52) U.S. Cl.
  CPC .................. *B01D 53/1493* (2013.01); *B01D 2252/20473* (2013.01); *B01D 2252/20484* (2013.01); *B01D 2252/20489* (2013.01); *B01D 2252/30* (2013.01); *B01D 2252/504* (2013.01); *B01D 2257/504* (2013.01); *B01D 2258/0283* (2013.01); *Y02C 10/06* (2013.01)

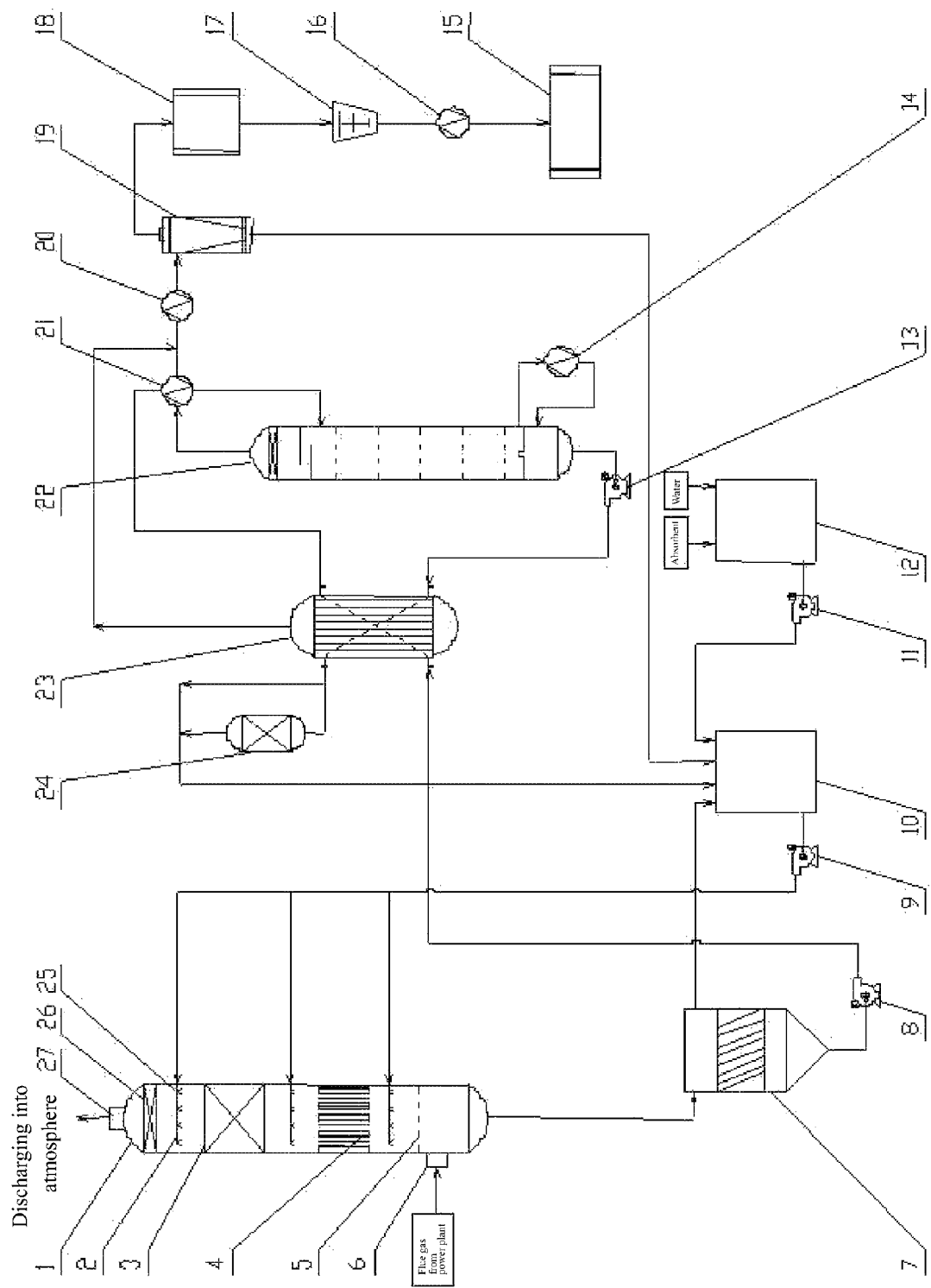

METHOD AND APPARATUS FOR COLLECTING CARBON DIOXIDE FROM FLUE GAS

CROSS-REFERENCE TO RELATED APPLICATIONS

This application is a continuation-in-part of International Patent Application No. PCT/CN2012/083575 with an international filing date of Oct. 26, 2012, designating the United States, now pending, and further claims priority benefits to Chinese Patent Application No. 201110437154.3 filed Dec. 23, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

Field of the Invention

The invention relates to the field of emission reduction and resource utilization of carbon dioxide from flue gas of a power plant boiler, and more particularly to a method and an apparatus for collecting carbon dioxide from flue gas.

Description of the Related Art

The chemical absorption method is widely applied in industries for capturing $CO_2$, and the principle of the chemical absorption method is as follows: $CO_2$ in the flue gas reacts with a chemical solvent and is absorbed thereby. A rich solution of the chemical solvent is acquired after absorbing $CO_2$ to an equilibrium state; then the rich solution is introduced into a regeneration tower, heated and decomposed for releasing $CO_2$ gas and being transformed into a barren solution. Thereafter, the barren solution is recycled to absorb $CO_2$ from the flue gas. Thus, by circulating an absorbent solution between an absorption tower and the regeneration tower, $CO_2$ in the flue gas is captured, separated, and purified. Currently, the chemical absorption method using an amino alcohol solution to absorb $CO_2$ is the most widely applied method, which specifically includes: an MEA (monoethanolamine) method, an MDEA, and a mixed organic amines method. In practice, it has been proved that, although the chemical absorption method using the amino alcohol solution has the characteristics of fast absorption speed, strong absorption ability, it still has the following defects when utilized in treating flue gas from power plant: 1) the oxidative degradation of the amino alcohol affects a long term and stable operation of the apparatus, and the solution consumption is large; 2) the apparatus is seriously corroded; and 3) MEA generally has a concentration of less than 20%, and thus the $CO_2$ absorption rate is low, but the energy consumption in regeneration is high. All these reasons result in the high cost of the method for collecting carbon dioxide by using amino alcohol.

SUMMARY OF THE INVENTION

In view of the above-described problems, it is one objective of the invention to provide a method and an apparatus for collecting carbon dioxide in power station flue gas. The method is characterized in high collecting efficiency, low energy consumption, and simple process flow.

To achieve the above objective, in accordance with one embodiment of the invention, there is provided a method for collecting carbon dioxide from flue gas of a power plant, the method comprising the following steps:

1) providing an organic amine and an ionic liquid in a molar ratio of (1-1.1):1, mixing the organic amine, the ionic liquid, and water to obtain an aqueous solution of a composite absorbent having a concentration of between 20 and 40 wt. %;

using the aqueous solution of the composite absorbent comprising the organic amine and the ionic liquid as a $CO_2$ absorbent, evenly spraying the aqueous solution of the composite absorbent into the flue gas from a rear part of a power plant boiler after dust removal and desulfurization to allow the flue gas flowing upwardly to fully contact with the downwardly sprayed aqueous solution of the composite absorbent and to allow $CO_2$ in the flue gas to react with the composite absorbent whereby absorbing $CO_2$. Principle of the absorption of $CO_2$ by the composite absorbent is as follows (A represents the organic amine and B represents the ionic liquid; the following equations do not represent the practical reaction process but include physical absorption and chemical absorption):

$$A + CO_2 \rightarrow A.CO_2$$

$$B + CO_2 \rightarrow B.CO_2$$

controlling a liquid-gas ratio between 5 and 25 L/m$^3$, a reaction temperature of between 40 and 55° C., and a reaction pressure of between 0.01 and 10 atm, so that the aqueous solution of the composite absorbent is capable of fully reacting with $CO_2$ in the flue gas at the proper temperature and the pressure, thereby yielding the solution rich in $A.CO_2$ and $B.CO_2$;

2) allowing the solution rich in $A.CO_2$ and $B.CO_2$ to stand and clarify under the action of self-aggregation to form different liquid layers comprising a lower layer being a mixed solution rich in $A.CO_2$ and $B.CO_2$ and an upper layer being the aqueous solution of the composite absorbent; separating the lower layer to obtain the mixed solution rich in $A.CO_2$ and $B.CO_2$;

conducting heat exchange on the separated mixed solution rich in $A.CO_2$ and $B.CO_2$ to enable $CO_2$ gas dissolved or adsorbed by the aqueous solution of the composite absorbent to evaporate whereby yielding a mixed solution rich in $A.CO_2$ and $B.CO_2$ after heat exchange;

3) thermally decomposing the mixed solution rich in $A.CO_2$ and $B.CO_2$ after heat exchange to release the chemically bound $CO_2$, whereby obtaining high-concentrated $CO_2$ gas and the aqueous solution of the composite absorbent, in which, a principal of the chemical reaction is as follows:

$$A.CO_2 \rightarrow A + CO_2 \uparrow$$

$$A + B.CO_2 \rightarrow A.CO_2 + B \rightarrow A + B + CO_2 \uparrow$$

4) returning the aqueous solution of the composite absorbent obtained in step 3) to step 1) as the $CO_2$ absorbent for recycling;

5) cooling the high-concentrated $CO_2$ gas separated from step 3) to condense water vapor therein;

6) conducting gas-liquid separation on the high-concentrated $CO_2$ gas after the cooling treatment in step 5) to remove a condensed water therein, whereby yielding $CO_2$ gas having a purity of exceeding 99% (highly purified $CO_2$ gas); and 7) desiccating the highly purified $CO_2$ gas (at a temperature of 110° C. for between 0.1 and 5 min), and compressing and condensing the highly purified $CO_2$ gas to transform the highly purified $CO_2$ gas into a liquid state, whereby obtaining a high-concentrated industrial liquid $CO_2$.

In a class of this embodiment, the ionic liquid in step 1) is selected from the group consisting of a conventional ionic liquid, a functionalized ionic liquid, a polymeric ionic liquid, and a mixture thereof in an arbitrary ratio.

In a class of this embodiment, the conventional ionic liquid is selected from the group consisting of an imidazole salt, a pyrrole salt, a pyridine salt, an ammonium salt, a sulfonate, and a mixture thereof in an arbitrary ratio.

In a class of this embodiment, the functionalized ionic liquid is an ionic liquid comprising an amino group.

In a class of this embodiment, the conventional ionic liquid is selected from the group consisting of 1-butyl-3-methylimidazolium tetrafluoroborate, 1-butyl-3-methylimidazolium hexafluorophosphate, 1-hexyl-3-methylimidazolium bis(trifluoromethylsulfonyl)imide, 1-hexyl-3-methylimidazolium hexafluorophosphate, and a mixture thereof in an arbitrary ratio.

In a class of this embodiment, the ionic liquid comprising an amino group is selected from the group consisting of 1-(1-amino-propyl)-3-methylimidazolium bromide, 1-(3-propylamino)-3-butyl-imidazolium tetrafluoroborate, and a mixture thereof in an arbitrary ratio.

In a class of this embodiment, the polymeric ionic liquid is selected from the group consisting of poly-1-(4-styryl)-3-methylimidazolium tetrafluoroborate, poly-1-(4-styryl)-3-methylimidazolium hexafluorophosphate, poly-1-(4-styryl)-3-methylimidazole-o-phenylmethylsulfonyl imide, poly-1-(4-styryl)-3-methylimidazolium trifluoromethylsulfonyl imide, poly-1-(4-styryl)-3-methylimidazolium tetrafluoroborate, and a mixture thereof in an arbitrary ratio.

In a class of this embodiment, the organic amine in step 1) is selected from the group consisting of ethanolamine, N-methyldiethanolamine, and a mixture thereof in an arbitrary ratio.

In a class of this embodiment, the thermal decomposition in step 3) is conducted at the temperature of between 80 and 110° C., a pressure of between 0.01 and 10 atm, and a time of between 1 and 5 min. $A.CO_2$ is firstly decomposed, in another word, $A.CO_2$ is decomposed into A and $CO_2$, while $B.CO_2$ is not prone to release $CO_2$ at such condition. Because $CO_2$ in $B.CO_2$ is easily captured by A to form $A.CO_2$ which continues to be decomposed and release $CO_2$, so that high-concentrated $CO_2$ gas and the aqueous solution of the composite absorbent are obtained.

In a class of this embodiment, the cooling treatment in step 5) comprises cooling the separated high-concentrated $CO_2$ gas to between 20 and 35° C. and controlling a cooling time to between 1 and 5 min. Thus, a large amount of water vapor is condensed and returned to a decomposition tower for recycling.

An apparatus for collecting carbon dioxide from flue gas of a power plant according to the above method, the apparatus comprises: an absorption tower, a sedimentation pool comprising slanting boards, a regeneration tower, a gas-liquid separator, a desiccator, a compressor, and a condenser. A rich solution flows from a bottom of the absorption tower into the sedimentation pool comprising the slanting boards for stratification. A gas outlet of the gas-liquid separator is in series connection with the desiccator, the compressor, the condenser, and a liquid carbon dioxide storage tank, respectively.

A bottom flow outlet of the sedimentation pool comprising the slanting boards is connected to a first medium (a mixed condensed liquid) inlet of a second heat exchanger (for conducting a first heating) via a pipe where a rich solution pump is disposed. A supernatant overflow of the sedimentation pool comprising the slanting boards is connected to an inlet of a circulating absorption solution storage tank via a pipe. An outlet of the circulating absorption solution storage tank is connected to a spray pipe of a spray layer in the absorption tower via a pipe where an absorption solution circulating pump is disposed.

A first medium (the mixed condensed liquid) outlet of the second exchange is connected to a first medium (the mixed condensed liquid) inlet of a first heat exchanger (for conducting a second heating) via a pipe. A first medium outlet of the first heat exchanger is connected to an inlet disposed on an upper part of the regeneration tower via a pipe. A gas outlet disposed on a top of the second heat exchanger is connected to a pipe connecting the first heat exchanger and a cooler. A gas outlet disposed on an upper part of the regeneration tower is connected to a second medium (gas, heating the first medium) inlet of the first heat exchanger via a pipe. A second medium outlet of the first heat exchanger is connected to an inlet of the cooler via a pipe. An outlet of the cooler is connected to an inlet of the gas-liquid separator via a pipe.

A liquid outlet disposed on a lower part of the regeneration tower is connected to a second medium inlet of the second heat exchanger via a pipe where a lean solution pump is disposed. A second medium outlet of the second heat exchanger is connected to the inlet of the circulating absorption solution storage tank via a pipe where a filter is disposed. A condensate overflow of the gas-liquid separator is connected to the inlet of the circulating absorption solution storage tank via a pipe. A solution storage tank for storing the aqueous solution of the composite absorbent is connected to the inlet of the circulating absorption solution storage tank via a pipe where a solution pump is disposed.

In a class of this embodiment, the absorption tower is a pneumatic bubbling tower. A sieve plate, a pneumatic bubbling layer, a filler layer, and a demister are respectively arranged bottom up in the absorption tower between a flue gas inlet arranged a lower part of the absorption tower and a flue gas outlet arranged on a top of the absorption tower.

In a class of this embodiment, the absorption tower is further provided with a spray layer, and the spray layer is provided with between 2 and 4 spray pipes. A plurality of nozzles are disposed on each spray pipe. The sieve plate comprises circular through-holes, and an area ratio of the circular through-holes and the sieve plate is between 30 and 40%. The demister comprises: an upper filter screen, a lower filter screen, and a spray unit disposed therebetween.

Advantages according to embodiments of the invention are summarized as follows.

1. The aqueous solution of the composite absorbent comprises the organic amine and the ionic liquid, and so the $CO_2$ removal rate is improved by 10% in contrast to the organic amine method. Both the two components can absorb or adsorb carbon dioxide, and the absorbed or adsorbed carbon dioxide can be released quickly and completely through the transference and decomposition in the regeneration tower. Thus, the method is highly efficient in the collection of carbon dioxide.

2. The products from the reaction of the aqueous solution of the composite absorbent and the flue gas are prone to aggregate to form a liquid layer different from water. The liquid layer rich in carbon dioxide is extracted and transported into the regeneration tower, thereby partly preventing the water from entering the regeneration tower, and greatly saving the energy consumption.

3. Passing through the second heat exchanger (lean-rich solution heat exchanger), part of carbon dioxide dissolved or adsorbed in the rich solution is released by heating, so the total weight of the rich solution entering the regeneration tower is reduced, thereby saving the energy consumption. Meanwhile, the low temperature rich solution from the absorption tower is heated respectively by the high temperature lean solution from the bottom of the regeneration tower and by the high temperature carbon dioxide from the top of the regeneration tower, thereby increasing the temperature of the rich solution and saving the energy consumption. Furthermore, the high temperature carbon dioxide from the top of the regeneration tower exchanges heat with the low temperature rich solution, thereby reducing the consumption of the cooling water in the cooler and saving the energy consumption.

4. The method has a simple process flow, and the involved devices have low costs. The invention solves the longstanding problems resulting from organic amines method, such as serious corrosion of the devices, high energy consumption, and high material consumption.

BRIEF DESCRIPTION OF THE DRAWINGS

The invention is described hereinbelow with reference to accompanying drawings, in which the sole FIGURE is a schematic diagram of an apparatus for collecting carbon dioxide from flue gas of a power plant.

In the drawings, the following reference numbers are used: 1—Absorption tower, 2—Spray layer, 3—Filler layer, 4—Pneumatic bubbling layer, 5—Sieve plate, 6—Flue gas inlet, 7—Sedimentation pool comprising slanting boards, 8—Rich solution pump, 9—Circulating pump, 10—Circulating absorption solution storage tank, 11—Solution pump, 12—Solution storage tank, 13—Lean solution pump, 14—Reboiler, 15—Liquid carbon dioxide storage tank, 16—Condenser, 17—Compressor, 18—Desiccator, 19—Gas-liquid separator, 20—Cooler, 21—First heat exchanger, 22—Regeneration tower, 23—Second heat exchanger (lean-rich solution heat exchanger), 24—Filter, 25—Nozzle, 26—Demister, 27—Flue gas outlet.

DETAILED DESCRIPTION OF THE EMBODIMENTS

For further illustrating the invention, experiments detailing a method and an apparatus for collecting carbon dioxide from flue gas of a power plant are described below. It should be noted that the following examples are intended to describe and not to limit the invention.

Example 1

A method for collecting carbon dioxide from flue gas of a power plant, the method comprises the following steps:

1) An organic amine and an ionic liquid in a molar ratio of 1.01:1 are collected. The organic amine, the ionic liquid, and water are mixed to obtain an aqueous solution of a composite absorbent having a concentration of 20 wt. %.

The ionic liquid is 1-butyl-3-methylimidazolium tetrafluoroborate of a conventional ionic liquid.

The organic amine is ethanolamine (MEA).

The aqueous solution of the composite absorbent comprising the organic amine and the ionic liquid is used as a $CO_2$ absorbent. The aqueous solution of the composite absorbent is evenly sprayed into the flue gas from a rear part of a power plant boiler after dust removal and desulfurization, so that the flue gas flowing upwardly fully contacts with the downwardly sprayed aqueous solution of the composite absorbent to allow $CO_2$ in the flue gas to react with the composite absorbent and to be absorbed.

A liquid-gas ratio (the liquid herein means the aqueous solution of the composite absorbent, and the gas herein means the flue gas) is controlled at 20 $L/m^3$. A temperature of the reaction between $CO_2$ in the flue gas and the aqueous solution of the composite absorbent is controlled at 50° C., and a pressure at an inlet of the absorption tower is controlled at 1.2 atm. Thus, the aqueous solution of the composite absorbent is able to fully react with $CO_2$ in the flue gas at the proper temperature and pressure, and a solution rich in $A.CO_2$ and $B.CO_2$ is yielded, in which, A represents the organic amine and B represents the functionalized ionic liquid.

2) Matters of $A.CO_2$ and $B.CO_2$ after absorbing $CO_2$ are self-aggregated, and the solution rich in $A.CO_2$ and $B.CO_2$ is stilled and clarified to form different liquid layers. A lower layer is a mixed solution rich in $A.CO_2$ and $B.CO_2$ and an upper layer is the aqueous solution of the composite absorbent. Thereafter, the lower layer of the mixed solution rich in $A.CO_2$ and $B.CO_2$ is separated.

3) Thermal decomposition is conducted on the separated mixed solution rich in $A.CO_2$ and $B.CO_2$. A temperature of the thermal decomposition is controlled at 100° C., a pressure of an outlet of a regeneration tower is controlled at 0.3 atm, and a heating time is controlled at 2 min. $A.CO_2$ is firstly decomposed, in another word, $A.CO_2$ is decomposed into A and $CO_2$, while $B.CO_2$ is not prone to release $CO_2$ at such condition. Because $CO_2$ in $B.CO_2$ is easily captured by A to form $A.CO_2$ which continues to be decomposed and release $CO_2$, so that high-concentrated $CO_2$ gas and the aqueous solution of the composite absorbent are obtained.

4) The aqueous solution of the composite absorbent obtained in step 3) is returned to step 1) as the $CO_2$ absorbent for recycling.

5) The high-concentrated $CO_2$ gas separated from step 3) is cooled to condense hot water vapor therein, during which, the high-concentrated $CO_2$ gas is cooled to a temperature of 30° C., and a cooling time is controlled at 1.5 min. Thus, a large amount of water vapor is condensed and returned to a decomposition tower for recycling.

6) The high-concentrated $CO_2$ gas after the cooling treatment in step 5) is introduced to the gas-liquid separator for gas-liquid separation. Condensed water therein is removed, and $CO_2$ gas having a purity of exceeding 99% is obtained.

7) The highly purified $CO_2$ gas obtained in step 6) is desiccated (at a temperature of 110° C. for between 2 min), compressed by a compressor, and condensed by a condenser to enable a temperature thereof to be 20° C. and a pressure thereof to be 72 atm, and transform the highly purified $CO_2$ gas into a liquid state, thereby obtaining a high-concentrated industrial liquid $CO_2$.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

As shown in FIG. 1, an apparatus for collecting carbon dioxide from flue gas of a power plant according to the above method, the apparatus comprises: an absorption tower 1, a sedimentation pool 7 comprising slanting boards, a second heat exchanger 23, a first heat exchanger 21, a regeneration tower 22, a gas-liquid separator 19, a desiccator 18, a compressor 17, and a condenser 16.

The absorption tower 1 is a pneumatic bubbling tower. A filler layer is disposed at an upper part of the absorption tower 1, a pneumatic bubbling layer is disposed at a middle part the absorption tower 1, and a sieve plate is disposed at a lower part of the absorption tower 1. The regeneration tower 22 is the sieve plate tower.

The sieve plates 5, the pneumatic bubbling layer 4, the filler layer 3, and the demister 26 are respectively arranged bottom up in the absorption tower 1 between a flue gas inlet 6 arranged the lower part of the absorption tower 1 and a flue gas outlet 27 arranged on a top of the absorption tower 1. The absorption tower 1 is further provided with a spray layer 2, and the spray layer 2 is provided with between 2 and 4 spray pipes. Three spray pipes are shown in FIG. 1, a first spray pipe is disposed above the sieve plate 5, a second is disposed above the pneumatic bubbling layer 4, and a third are disposed above the filler layer 3. A plurality of nozzles 25 are disposed on each spray pipe. The specific number of the nozzles is determined according to the flow rate, and generally each spray pipe is provided with between 2 and 20 nozzles. The sieve plate 5 comprises circular through-holes, and an area ratio of the circular through-holes and the sieve plate 5 is between 30 and 40%. The demister 26 is provided with an upper filter screen, a lower filter screen, and a spray unit disposed therebetween, so that the composite absorbent drops trapped in the flue gas are completely removed.

A rich solution outlet arranged at a bottom of the absorption tower 1 is connected to an inlet of the sedimentation pool 7 comprising the slanting boards via a pipe, so that the rich solution from the bottom of the absorption tower 1 flows into the sedimentation pool 7 comprising the slanting boards for stratification. A supernatant in the sedimentation pool 7 comprising the slanting boards is the aqueous solution of the composite absorbent, and a bottom flow therein is primarily a mixed aggregated liquid of a product of the composite absorbent. A bottom flow outlet of the sedimentation pool 7 comprising the slanting boards is connected to a first medium (a mixed aggregated liquid) inlet of a second heat exchanger 23 (for conducting a first heating) via a pipe where a rich solution pump 8 is disposed. A supernatant overflow of the sedimentation pool 7 comprising the slanting boards is connected to an inlet of a circulating absorption solution storage tank 10 via a pipe. An outlet of the circulating absorption solution storage tank 10 is connected to a spray pipe of a spray layer 2 in the absorption tower 1 via a pipe where an absorption solution circulating pump 9 is disposed.

A first medium (the mixed aggregated liquid) outlet of the second exchange 23 is connected to a first medium (the mixed aggregated liquid) inlet of a first heat exchanger 21 (for conducting a second heating) via a pipe. A first medium (the mixed aggregated liquid) outlet of the first heat exchanger 21 is connected to an inlet disposed on an upper part of the regeneration tower 22 via a pipe. A gas outlet disposed on a top of the second heat exchanger 23 is connected to a pipe connecting the first heat exchanger 21 and a cooler 20. A gas outlet disposed on an upper part of the regeneration tower 22 is connected to a second medium (gas, heating the first medium) inlet of the first heat exchanger 21 via a pipe. A second medium outlet of the first heat exchanger 21 is connected to an inlet of the cooler 20 via a pipe. An outlet of the cooler 20 is connected to an inlet of the gas-liquid separator 19 via a pipe.

A reboiler 14 matching with the regeneration tower 22 is disposed outside the bottom of the regeneration tower. An outlet of the reboiler 14 is connected to a liquid storage tank arranged at the bottom of the regeneration tower via a pipe. An inlet of the reboiler 14 is connected to the liquid storage tank at the bottom of the regeneration tower via a pipe. A liquid outlet disposed on a lower part of the regeneration tower 22 is connected to a second medium inlet of the second heat exchanger 23 via a pipe where a lean solution pump 13 is disposed. A second medium outlet of the second heat exchanger 23 is connected to the inlet of the circulating absorption solution storage tank 10 via a pipe where a filter 24 is disposed.

A gas outlet of the gas-liquid separator 19 is in series connection with the desiccator 18, the compressor 17, the condenser 16, and a liquid carbon dioxide storage tank 15, respectively. A condensate overflow of the gas-liquid separator 19 is connected to the inlet of the circulating absorption solution storage tank 10 via a pipe.

A solution storage tank 12 for storing the aqueous solution of the composite absorbent is connected to the inlet of the circulating absorption solution storage tank 10 via a pipe where a solution pump is disposed 11 (supplemental aqueous solution of the composite absorbent and water are added to the solution storage tank 12).

The above devices are generally common devices in the field of chemical industry, and specific structures thereof will not be repeatedly illustrated herein.

The sieve plate are arranged above the flue gas inlet in the lower part of the absorption tower for facilitating even distribution of the flue gas and gas-liquid contact. The area ratio of the through holes and the sieve plate is controlled between 20 and 40%. Thus, in one respect, after the upwardly flowing flue gas passes the sieve plate, the flow distribution thereof becomes more evenly, dead angle of the flue gas flow is effectively eliminated, thereby being beneficial for the full contact between the flue gas and the absorbent solution; and in the other respect, under the action of the interactive jet of a plurality sets of nozzles, a spray coverage on the cross section of the absorption tower reaches exceeding 300%, so that the carbon dioxide in flue gas fully contacts with and reacts with the absorbent solution, thereby being absorbed.

The lean-rich solution heat exchangers are designed. The rich solution outlet arranged at the sedimentation pool 7 comprising the slanting boards is connected to the inlet arranged on the upper part of the regeneration tower via the rich solution pump, the second (lean-rich solution) heat exchanger, and the first heat exchanger. The lean solution outlet of the regeneration tower is connected to the liquid inlet arranged on the upper part of the circulating absorption solution storage tank via the lean solution pump and the second (lean-rich solution) heat exchanger. Thus, exhaust heat of the lean solution in the regeneration tower and the flue gas at the outlet of the regeneration tower are utilized to preheat the rich solution introduced into the regeneration tower. Meanwhile, temperatures of the lean solution discharged from the lower part of the regeneration tower and the flue gas discharged from the upper part of the regeneration tower are decreased, thereby realizing a virtuous circulation of the heat exchange and saving the heat energy resource.

Working process of the method and the apparatus for collecting flue gas are as follows:

The flue gas from the rear part of the power plant boiler after the dust removal and desulfurization is introduced into the absorption tower 1 via the flue gas inlet 6 arranged at the lower part the absorption tower 1. The flue gas flows upwardly and passes the sieve plate 5, the pneumatic bubbling layer 4, and the filler layer 3, respectively. Meanwhile, the aqueous solution of the composite absorbent is sprayed downwardly from the spray layer 2. The liquid-gas ratio is controlled at between 5 and 25 L/m³. A temperature of the reaction between $CO_2$ in the flue gas and the aqueous solution of the composite absorbent is preferably controlled at between 40 and 55° C., and a reaction pressure is controlled at between 0.01 and 10 atm. Thus, $CO_2$ in the flue gas fully contacts with the aqueous solution of the composite absorbent in the filler layer 3 and the pneumatic bubbling layer 4, and $CO_2$ are chemical composited or absorbed in the solution.

The flue gas after removal of a large amount of $CO_2$ continuously flows upwardly, frog droplets of the absorbent therein are removed by the demister 26 arranged on the top of the absorption tower 1, and clean flue gas are directly discharged into the atmosphere. The rich solution after $CO_2$ absorption falls to the bottom of the absorption tower, and flows to the sedimentation pool 7 comprising the slanting boards for aggregation and stratification. A resulting supernatant is a solution containing a small amount of the composite absorbent, and a bottom flow mainly contains aggregated slurry of the product of the composite absorbent. The bottom flow in the sedimentation pool comprising the slanting boards is transported by the rich solution pump to be heated for the first time in the tube side of the second heat exchanger 23 (the lean-rich solution heat exchanger) and be heated for the second time in the first heat exchanger 21, and then enters the regeneration tower 22 via the inlet arranged on the upper part therein. A partial of dissolved or absorbed $CO_2$ is released from the rich solution after being heated by the second heat exchanger 23 (the lean-rich solution heat exchanger).

The rich solution compositing or absorbing $CO_2$ is sprayed into the regeneration tower 22, and passes through each sieve plate, respectively. The product of the composite absorbent is heated by the upwardly flowing vapor and decomposed, so that $CO_2$ is released. Incompletely decomposed slurry of the product of the composite absorbent falls to the bottom of the regeneration tower, heated by the reboiler 14 arranged at the bottom of the regeneration tower to a temperature of between 80 and 110° C., thereby further decomposing high-concentrated $CO_2$ and completely decomposing the product of the composite absorbent.

The released $CO_2$ gas together with a large amount of water vapor flow out of the regeneration tower 22 via the gas outlet arranged on the upper part thereof, and enters the first heat exchanger 21, and heat the rich solution heated by the second heat exchanger 23 (the lean-rich solution heat exchanger). After the heat exchange, the gas is mixed with the gas released from the heating by the second heat exchanger 23 (the lean-rich solution heat exchanger) and the mixed gas is introduced to the cooler 20, where the $CO_2$ gas is cooled to a temperature between 25 and 35° C., and a large amount of water vapor therein is condensed and separated.

The solution of the composite absorbent decomposed in the regeneration tower 22 is pumped by the lean solution pump 13 and is introduced to the tube side of the second heat exchanger 23 (the lean-rich solution heat exchanger) for releasing the heat energy. The cooled solution of the composite absorbent is introduced to the filer 24, where the dissolved heavy metal or impurities in the reaction in the flue gas produced are removed. A purified solution of the composite absorbent flows into the circulating absorption solution storage tank 10. Supplemental composite absorbent and process water are added to the solution storage tank 12 and are transported to the circulating absorption solution storage tank 10 via the solution pump 11. The circulating absorbing solution is transported by the absorption solution circulating pump to the spray layer 2 in the absorption tower and is sprayed and then absorbed.

The highly purified $CO_2$ gas after the treatment of the cooler 20 is introduced to the gas-liquid separator 19. Condensed liquid trapped in the $CO_2$ gas are completely separated under the centrifugal action, and the $CO_2$ gas having the purity exceeding 99% is acquired. The separated condensing liquid flows from the condensate outlet of the gas-liquid separator 19 into the circulating absorption solution storage tank 10 for recycling. The separated highly purified $CO_2$ is then desiccated by the desiccator 18, compressed by the compressor 17, and condensed by the condenser 16 and is transformed into a liquid state. The high-concentrated industrial liquid $CO_2$ is obtained and finally transported to the liquid carbon dioxide storage tank 15 for storage.

Example 2

A method for collecting carbon dioxide from flue gas of a power plant, the method comprises the following steps:

1) An organic amine and a functionalized ionic liquid in a molar ratio of 1.1:1 are collected. The organic amine, the functionalized ionic liquid, and water are mixed to obtain an aqueous solution of a composite absorbent having a concentration of 40 wt. %.

The functionalized ionic liquid is an ionic liquid comprising an amino group and is 1-(1-amino-propyl)-3-methylimidazolium bromide.

The organic amine is N-methyldiethanolamine (MDEA).

The aqueous solution of the composite absorbent comprising the organic amine and the ionic liquid is used as a $CO_2$ absorbent. The aqueous solution of the composite absorbent is evenly sprayed into the flue gas from a rear part of a power plant boiler after dust removal and desulfurization, so that the flue gas flowing upwardly fully contacts with the downwardly sprayed aqueous solution of the composite absorbent to allow $CO_2$ in the flue gas to react with the composite absorbent and to be absorbed.

A liquid-gas ratio (the liquid herein means the aqueous solution of the composite absorbent, and the gas herein means the flue gas) is controlled at 20 L/m³. A temperature of the reaction between $CO_2$ in the flue gas and the aqueous solution of the composite absorbent is controlled at 50° C., and a pressure at an inlet of the absorption tower is controlled at 1.2 atm. Thus, the aqueous solution of the composite absorbent is able to fully react with $CO_2$ in the flue gas at the proper temperature and pressure, and a solution rich in $A.CO_2$ and $B.CO_2$ is yielded, in which, A represents the organic amine and B represents the functionalized ionic liquid.

2) Matters of $A.CO_2$ and $B.CO_2$ after absorbing $CO_2$ are self-aggregated, and the solution rich in $A.CO_2$ and $B.CO_2$ is stilled and clarified to form different liquid layers. A lower layer is a mixed solution rich in $A.CO_2$ and $B.CO_2$ and an upper layer is the aqueous solution of the composite absorbent. Thereafter, the lower layer of the mixed solution rich in $A.CO_2$ and $B.CO_2$ is separated.

3) Thermal decomposition is conducted on the separated mixed solution rich in $A.CO_2$ and $B.CO_2$. A temperature of the thermal decomposition is controlled at 100° C., a pressure of an outlet of a regeneration tower is controlled at 0.3 atm, and a heating time is controlled at 2 min. $A.CO_2$ is firstly decomposed, in another word, $A.CO_2$ is decomposed into A and $CO_2$, while $B.CO_2$ is not prone to release $CO_2$ at such condition. Because $CO_2$ in $B.CO_2$ is easily captured by A to form $A.CO_2$ which continues to be decomposed and release $CO_2$, so that high-concentrated $CO_2$ gas and the aqueous solution of the composite absorbent are obtained.

4) The aqueous solution of the composite absorbent obtained in step 3) is returned to step 1) as the $CO_2$ absorbent for recycling.

5) The high-concentrated $CO_2$ gas separated from step 3) is cooled to condense hot water vapor therein, during which, the high-concentrated $CO_2$ gas is cooled to a temperature of 30° C., and a cooling time is controlled at 1.5 min. Thus, a large amount of water vapor is condensed and returned to a decomposition tower for recycling.

6) The high-concentrated $CO_2$ gas after the cooling treatment in step 5) is introduced to the gas-liquid separator for gas-liquid separation. Condensed water therein is removed, and $CO_2$ gas having a purity of exceeding 99% is obtained.

7) The highly purified $CO_2$ gas obtained in step 6) is desiccated (at a temperature of 110° C. for between 2 min), compressed by a compressor, and condensed by a condenser to enable a temperature thereof to be 20° C. and a pressure thereof to be 72 atm, and transform the highly purified $CO_2$ gas into a liquid state, thereby obtaining a high-concentrated industrial liquid $CO_2$.

Experiment results are as follows:

A content of $CO_2$ in the flue gas at the inlet of the absorption tower is 12 v. %, and a content of $CO_2$ in the flue gas at the outlet of the absorption tower is 0.4 v. %, thus, an absorption efficiency of carbon dioxide reaches 96.7%.

Energy consumption for regeneration after absorption of $CO_2$ for the conventional MEA is $2.1 \times 10^7$ kJ/h, and the energy consumption for regeneration tested in this experiment is $1.46 \times 10^7$ kJ/h, so that the energy consumption is decreased by 30.5%.

Example 3

A method for collecting carbon dioxide from flue gas of a power plant, the method comprises the following steps:

1) An organic amine and an ionic liquid in a molar ratio of 1.05:1 are collected. The organic amine, the ionic liquid, and water are mixed to obtain an aqueous solution of a composite absorbent having a concentration of 40 wt. %.

The ionic liquid is a polymeric ionic liquid, and the polymeric ionic liquid is poly-1-(4-styryl)-3-methylimidazolium tetrafluoroborate.

The organic amine comprises ethanolamine (MEA) and N-methyldiethanolamine (MDEA); and dosages of MEA and MDEA account for ½ of a total weight of the organic amine, respectively.

The aqueous solution of the composite absorbent comprising the organic amine and the ionic liquid is used as a $CO_2$ absorbent. The aqueous solution of the composite absorbent is evenly sprayed into the flue gas from a rear part of a power plant boiler after dust removal and desulfurization, so that the flue gas flowing upwardly fully contacts with the downwardly sprayed aqueous solution of the composite absorbent to allow $CO_2$ in the flue gas to react with the composite absorbent and to be absorbed.

A liquid-gas ratio (the liquid herein means the aqueous solution of the composite absorbent, and the gas herein means the flue gas) is controlled at 20 L/m³. A temperature of the reaction between $CO_2$ in the flue gas and the aqueous solution of the composite absorbent is controlled at 50° C., and a pressure at an inlet of the absorption tower is controlled at 1.2 atm. Thus, the aqueous solution of the composite absorbent is able to fully react with $CO_2$ in the flue gas at the proper temperature and pressure, and a solution rich in $A.CO_2$ and $B.CO_2$ is yielded, in which, A represents the organic amine and B represents the functionalized ionic liquid.

2) Matters of $A.CO_2$ and $B.CO_2$ after absorbing $CO_2$ are self-aggregated, and the solution rich in $A.CO_2$ and $B.CO_2$ is stilled and clarified to form different liquid layers. A lower layer is a mixed solution rich in $A.CO_2$ and $B.CO_2$ and an upper layer is the aqueous solution of the composite absorbent. Thereafter, the lower layer of the mixed solution rich in $A.CO_2$ and $B.CO_2$ is separated.

3) Thermal decomposition is conducted on the separated mixed solution rich in $A.CO_2$ and $B.CO_2$. A temperature of the thermal decomposition is controlled at 100° C., a pressure of an outlet of a regeneration tower is controlled at 0.3 atm, and a heating time is controlled at 2 min. $A.CO_2$ is firstly decomposed, in another word, $A.CO_2$ is decomposed into A and $CO_2$, while $B.CO_2$ is not prone to release $CO_2$ at such condition. Because $CO_2$ in $B.CO_2$ is easily captured by A to form $A.CO_2$ which continues to be decomposed and release $CO_2$, so that high-concentrated $CO_2$ gas and the aqueous solution of the composite absorbent are obtained.

4) The aqueous solution of the composite absorbent obtained in step 3) is returned to step 1) as the $CO_2$ absorbent for recycling.

5) The high-concentrated $CO_2$ gas separated from step 3) is cooled to condense hot water vapor therein, during which, the high-concentrated $CO_2$ gas is cooled to a temperature of 30° C., and a cooling time is controlled at 1.5 min. Thus, a large amount of water vapor is condensed and returned to a decomposition tower for recycling.

6) The high-concentrated $CO_2$ gas after the cooling treatment in step 5) is introduced to the gas-liquid separator for gas-liquid separation. Condensed water therein is removed, and $CO_2$ gas having a purity of exceeding 99% is obtained.

7) The highly purified $CO_2$ gas obtained in step 6) is desiccated (at a temperature of 110° C. for between 2 min), compressed by a compressor, and condensed by a condenser to enable a temperature thereof to be 20° C. and a pressure thereof to be 72 atm, and transform the highly purified $CO_2$ gas into a liquid state, thereby obtaining a high-concentrated industrial liquid $CO_2$.

Experiment results are as follows:

A content of $CO_2$ in the flue gas at the inlet of the absorption tower is 12 v. %, and a content of $CO_2$ in the flue gas at the outlet of the absorption tower is 0.6 v. %, thus, an absorption efficiency of carbon dioxide reaches 95%.

Energy consumption for regeneration after absorption of $CO_2$ for the conventional MEA is $2.1 \times 10^7$ kJ/h, and the energy consumption for regeneration tested in this experiment is $1.49 \times 10^7$ kJ/h, so that the energy consumption is decreased by 29.1%.

Example 4

A method for collecting carbon dioxide from flue gas of a power plant is basically the same as that in Example 1 except that the molar ratio of the organic amine and the ionic liquid is 1:1; the organic amine, the ionic liquid, and water are mixed and a resulting aqueous solution of a composite absorbent has a concentration of 30 wt. %.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 5

A method for collecting carbon dioxide from flue gas of a power plant is basically the same as that in Example 1 except that the liquid-gas ratio in step 1) is controlled at 5 L/m$^3$, the temperature of the reaction between $CO_2$ in the flue gas and the aqueous solution of the composite absorbent is controlled at 40° C., and the reaction pressure is controlled at 0.01 atm.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 6

A method for collecting carbon dioxide from flue gas of a power plant is basically the same as that in Example 1 except that the liquid-gas ratio in step 1) is controlled at 25 L/m$^3$, the temperature of the reaction between $CO_2$ in the flue gas and the aqueous solution of the composite absorbent is controlled at 55° C., and the reaction pressure is controlled at 10 atm.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 7

A method for collecting carbon dioxide from flue gas of a power plant is basically the same as that in Example 1 except that thermal decomposition in step 3) is performed at a temperature of 80° C., a pressure of 0.01 atm, and a heating time of 1 min.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 8

A method for collecting carbon dioxide from flue gas of a power plant is basically the same as that in Example 1 except that thermal decomposition in step 3) is performed at a temperature of 110° C., a pressure of 10 atm, and a heating time of 5 min.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 9

A method for collecting carbon dioxide from flue gas of a power plant is basically the same as that in Example 1 except that during the cooling treatment in step 5), the high-concentrated $CO_2$ gas is cooled to a temperature of 20° C., and a cooling time is controlled at 1 min.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 10

A method for collecting carbon dioxide from flue gas of a power plant is basically the same as that in Example 1 except that during the cooling treatment in step 5), the high-concentrated $CO_2$ gas is cooled to a temperature of 35° C., and a cooling time is controlled at 5 min.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 11

A method for collecting carbon dioxide from flue gas of a power plant is basically the same as that in Example 1 except that the desiccation treatment in step 7) is performed at a temperature of 110° C. and a time is controlled at 0.1 min.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 12

A method for collecting carbon dioxide from flue gas of a power plant is basically the same as that in Example 1 except that the desiccation treatment in step 7) is performed at a temperature of 110° C. and a time is controlled at 5 min.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 13

A method for collecting carbon dioxide from flue gas of a power plant is basically the same as that in Example 1 except that the ionic liquid is 1-butyl-3-methylimidazolium tetrafluoroborate of a conventional ion liquid.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 14

A method for collecting carbon dioxide from flue gas of a power plant is basically the same as that in Example 1 except that the ionic liquid is 1-hexyl-3-methylimidazolium bis(trifluoromethylsulfonyl)imide of a conventional ion liquid.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 15

A method for collecting carbon dioxide from flue gas of a power plant is basically the same as that in Example 1 except that the ionic liquid is 1-hexyl-3-methylimidazolium hexafluorophosphate of a conventional ion liquid.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 16

A method for collecting carbon dioxide from flue gas of a power plant is basically the same as that in Example 1 except that the ionic liquid includes 1-butyl-3-methylimidazolium hexafluorophosphate, 1-hexyl-3-methylimidazolium bis(trifluoromethylsulfonyl)imide, and 1-hexyl-3-methylimidazolium hexafluorophosphate of a conventional ion liquid; and dosages thereof account for ⅓ of a total weight of the ionic liquid, respectively.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 17

A method for collecting carbon dioxide from flue gas of a power plant is basically the same as that in Example 1 except that the ionic liquid includes a conventional ionic liquid and a functionalized ionic liquid, and dosages thereof account for ½ of a total weight of the ionic liquid, respectively.

The conventional ionic liquid is 1-butyl-3-methylimidazolium tetrafluoroborate; and the functionalized ionic liquid is 1-(1-amino-propyl)-3-methylimidazolium bromide.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 18

A method for collecting carbon dioxide from flue gas of a power plant is basically the same as that in Example 1 except that the ionic liquid includes: a conventional ionic liquid, a functionalized ionic liquid, and a polymeric ionic liquid; and dosages thereof account for ⅓ of a total weight of the ionic liquid, respectively.

The conventional ionic liquid is 1-butyl-3-methylimidazolium tetrafluoroborate; and the functionalized ionic liquid is 1-(1-amino-propyl)-3-methylimidazolium bromide; and the polymeric ionic liquid is poly-1-(4-styryl)-3-methylimidazolium tetrafluoroborate.

Experiment results are as follows:

A content of $CO_2$ in the flue gas at the inlet of the absorption tower is 12 v. %, and a content of $CO_2$ in the flue gas at the outlet of the absorption tower is 0.7 v. %, thus, an absorption efficiency of carbon dioxide reaches 94.2%.

Energy consumption for regeneration after absorption of $CO_2$ for the conventional MEA is $2.1 \times 10^7$ kJ/h, and the energy consumption for regeneration tested in this experiment is $1.52 \times 10^7$ kJ/h, so that the energy consumption is decreased by 27.6%.

Example 19

A method for collecting carbon dioxide from flue gas of a power plant is basically the same as that in Example 2 except that the functionalized ionic liquid is 1-(3-propylamino)-3-butyl-imidazolium tetrafluoroborate.

Experiment results are as follows:

A content of $CO_2$ in the flue gas at the inlet of the absorption tower is 12 v. %, and a content of $CO_2$ in the flue gas at the outlet of the absorption tower is 0.4 v. %, thus, an absorption efficiency of carbon dioxide reaches 96.7%.

Energy consumption for regeneration after absorption of $CO_2$ for the conventional MEA is $2.1 \times 10^7$ kJ/h, and the energy consumption for regeneration tested in this experiment is $1.46 \times 10^7$ kJ/h, so that the energy consumption is decreased by 30.5%.

Example 20

A method for collecting carbon dioxide from flue gas of a power plant is basically the same as that in Example 2 except that the functionalized ionic liquid includes 1-(1-amino-propyl)-3-methylimidazolium bromide and 1-(3-propylamino)-3-butyl-imidazolium tetrafluoroborate; and dosages thereof account for ½ of the total weight of the functionalized ionic liquid, respectively.

Experiment results are as follows:

A content of $CO_2$ in the flue gas at the inlet of the absorption tower is 12 v. %, and a content of $CO_2$ in the flue gas at the outlet of the absorption tower is 0.4 v. %, thus, an absorption efficiency of carbon dioxide reaches 96.7%.

Energy consumption for regeneration after absorption of $CO_2$ for the conventional MEA is $2.1 \times 10^7$ kJ/h, and the energy consumption for regeneration tested in this experiment is $1.46 \times 10^7$ kJ/h, so that the energy consumption is decreased by 30.5%.

Example 21

A method for collecting carbon dioxide from flue gas of a power plant is basically the same as that in Example 3 except that the polymeric ionic liquid is poly-1-(4-styryl)-3-methylimidazolium hexafluorophosphate.

Experiment results are as follows:

A content of $CO_2$ in the flue gas at the inlet of the absorption tower is 12 v. %, and a content of $CO_2$ in the flue gas at the outlet of the absorption tower is 0.6 v. %, thus, an absorption efficiency of carbon dioxide reaches 95%.

Energy consumption for regeneration after absorption of $CO_2$ for the conventional MEA is $2.1 \times 10^7$ kJ/h, and the energy consumption for regeneration tested in this experiment is $1.49 \times 10^7$ kJ/h, so that the energy consumption is decreased by 29.1%.

Example 22

A method for collecting carbon dioxide from flue gas of a power plant is basically the same as that in Example 3 except that the polymeric ionic liquid is poly-1-(4-styryl)-3-methylimidazole-o-phenylmethylsulfonyl imide.

Experiment results are as follows:

A content of $CO_2$ in the flue gas at the inlet of the absorption tower is 12 v. %, and a content of $CO_2$ in the flue gas at the outlet of the absorption tower is 0.6 v. %, thus, an absorption efficiency of carbon dioxide reaches 95%.

Energy consumption for regeneration after absorption of $CO_2$ for the conventional MEA is $2.1 \times 10^7$ kJ/h, and the energy consumption for regeneration tested in this experiment is $1.49 \times 10^7$ kJ/h, so that the energy consumption is decreased by 29.1%.

Example 23

A method for collecting carbon dioxide from flue gas of a power plant is basically the same as that in Example 3 except that the polymeric ionic liquid includes poly-1-(4-styryl)-3-methylimidazolium trifluoromethylsulfonyl imide and poly-1-(4-styryl)-3-methylimidazolium tetrafluoroborate; and dosages thereof account for ½ of a total weight of the polymeric ionic liquid, respectively.

Experiment results are as follows:

A content of $CO_2$ in the flue gas at the inlet of the absorption tower is 12 v. %, and a content of $CO_2$ in the flue gas at the outlet of the absorption tower is 0.6 v. %, thus, an absorption efficiency of carbon dioxide reaches 95%.

Energy consumption for regeneration after absorption of $CO_2$ for the conventional MEA is $2.1 \times 10^7$ kJ/h, and the energy consumption for regeneration tested in this experiment is $1.49 \times 10^7$ kJ/h, so that the energy consumption is decreased by 29.1%.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for collecting carbon dioxide from flue gas of a power plant, the method comprising the following steps:
   1) providing an organic amine and an ionic liquid in a molar ratio of (1-1.1):1, mixing the organic amine, the ionic liquid, and water to obtain a first aqueous solution of a composite absorbent having a concentration of between 20 and 40 wt. %;
   using the first aqueous solution of the composite absorbent comprising the organic amine and the ionic liquid as a $CO_2$ absorbent, evenly spraying the first aqueous solution of the composite absorbent into the flue gas from a rear part of a power plant boiler after dust removal and desulfurization to allow the flue gas flowing upwardly to fully contact with the first aqueous solution of the composite absorbent and to allow $CO_2$ in the flue gas to react with the composite absorbent, controlling a liquid-gas ratio between 5 and 25 L/m³, a reaction temperature of between 40 and 55° C., and a reaction pressure of between 0.01 and 10 atm, thereby absorbing $CO_2$ to yield a solution rich in $A.CO_2$ and $B.CO_2$, in which A represents the organic amine and B represents the ionic liquid;

2) allowing the solution rich in $A.CO_2$ and $B.CO_2$ to stand and clarify to form a lower layer and an upper layer, wherein the composite absorbent is substantially distributed in the upper layer and the $A.CO_2$ and $B.CO_2$ are substantially distributed in the lower layer; separating the upper layer from the solution rich in $A.CO_2$ and $B.CO_2$ to obtain a second aqueous solution of the composite absorbent and returning the second aqueous solution of the composite absorbent to step 1) as the $CO_2$ absorbent separating the lower layer from the solution rich in $A.CO_2$ and $B.CO_2$ to obtain a mixed solution rich in $A.CO_2$ and $B.CO_2$;

heating the mixed solution rich in $A.CO_2$ and $B.CO_2$ to enable $CO_2$ gas dissolved or absorbed by the first aqueous solution of the composite absorbent therein to evaporate thereby yielding a first $CO_2$ gas and a heated mixed solution rich in $A.CO_2$ and $B.CO_2$;

3) thermally decomposing the heated mixed solution rich in $A.CO_2$ and $B.CO_2$ to release chemically bound $CO_2$, thereby obtaining a second $CO_2$ gas and a third aqueous solution of the composite absorbent; returning the second $CO_2$ gas and the third aqueous solution of the composite absorbent to step 2) to heat the mixed solution rich in $A.CO_2$ and $B.CO_2$;

4) returning the third aqueous solution of the composite absorbent obtained in step 3) to step 1) as the $CO_2$ absorbent;

5) cooling the second $CO_2$ gas separated from step 3) to condense water vapor therein and to obtain a mixture of $CO_2$ gas and condensed water;

6) conducting gas-liquid separation on the mixture of $CO_2$ gas and condensed water to remove the condensed water therein, thereby yielding a third $CO_2$ gas having a purity of exceeding 99%; and 7) desiccating, compressing, and condensing the third $CO_2$ gas having the purity of exceeding 99% obtained in step 6) to transform the third $CO_2$ gas into a liquid state.

2. The method of claim 1, further comprising storing the second aqueous solution of the composite absorbent in step 2) and the third aqueous solution of the composite absorbent in step 3) in a circulating absorption solution storage tank; transporting the second aqueous solution of the composite absorbent and the third aqueous solution of the composite absorbent to a spray layer; and spraying the second aqueous solution of the composite absorbent and the third aqueous solution of the composite absorbent into the flue gas.

3. The method of claim 2, further comprising adding a supplemental aqueous solution of composite absorbent into a solution storage tank, and transporting the supplemental aqueous solution of composite absorbent to the circulating absorption solution storage tank.

4. The method of claim 1, wherein the organic amine in step 1) is selected from the group consisting of ethanolamine, N-methyldiethanolamine, and a mixture thereof in an arbitrary ratio.

5. The method of claim 1, wherein the thermal decomposition in step 3) is conducted at the temperature of between 80 and 110° C., a pressure of between 0.01 and 10 atm, and a time of between 1 and 5 min.

6. The method of claim 1, wherein step 5) comprises cooling the second $CO_2$ gas to between 20 and 35° C. and controlling a cooling time to between 1 and 5 min.

7. The method of claim 1, wherein the ionic liquid in step 1) is selected from the group consisting of a conventional ionic liquid, a functionalized ionic liquid, a polymeric ionic liquid, and a mixture thereof in an arbitrary ratio.

8. The method of claim 7, wherein the conventional ionic liquid is selected from the group consisting of 1-butyl-3-methylimidazolium tetrafluoroborate, 1-butyl-3-methylimidazolium hexafluorophosphate, 1-hexyl-3-methylimidazolium bis(trifluoromethylsulfonyl)imide, 1-hexyl-3-methylimidazolium hexafluorophosphate, and a mixture thereof in an arbitrary ratio.

9. The method of claim 7, wherein the polymeric ionic liquid is selected from the group consisting of poly-1-(4-styryl)-3-methylimidazolium tetrafluoroborate, poly-1-(4-styryl)-3-methylimidazolium hexafluorophosphate, poly-1-(4-styryl)-3-methylimidazole-o-phenylmethylsulfonyl imide, poly-1-(4-styryl)-3-methylimidazolium trifluoromethylsulfonyl imide, poly-1-(4-styryl)-3-methylimidazolium tetrafluoroborate, and a mixture thereof in an arbitrary ratio.

10. The method of claim 7, wherein the conventional ionic liquid is selected from the group consisting of an imidazole salt, a pyrrole salt, a pyridine salt, an ammonium salt, a sulfonate, and a mixture thereof in an arbitrary ratio.

11. The method of claim 10, wherein the conventional ionic liquid is selected from the group consisting of 1-butyl-3-methylimidazolium tetrafluoroborate, 1-butyl-3-methylimidazolium hexafluorophosphate, 1-hexyl-3-methylimidazolium bis(trifluoromethylsulfonyl)imide, 1-hexyl-3-methylimidazolium hexafluorophosphate, and a mixture thereof in an arbitrary ratio.

12. The method of claim 7, wherein the functionalized ionic liquid is an ionic liquid comprising an amino group.

13. The method of claim 12, wherein the ionic liquid comprising an amino group is selected from the group consisting of 1-(1-amino-propyl)-3-methylimidazolium bromide, 1-(3-propylamino)-3-butyl-imidazolium tetrafluoroborate, and a mixture thereof in an arbitrary ratio.

* * * * *